Oct. 21, 1941.    J. H. BARTHOLOMEW    2,259,449
COLLECTIVE CONTROL SYSTEM
Filed Nov. 3, 1937        6 Sheets-Sheet 1

INVENTOR.
JAMES H. BARTHOLOMEW.
BY George A. Gillette, Jr.
ATTORNEY.

FIG. 3

Oct. 21, 1941.  J. H. BARTHOLOMEW  2,259,449
COLLECTIVE CONTROL SYSTEM
Filed Nov. 3, 1937   6 Sheets-Sheet 4

INVENTOR.
JAMES H. BARTHOLOMEW.
BY George A. Gillette, Jr.
ATTORNEY.

Patented Oct. 21, 1941

2,259,449

UNITED STATES PATENT OFFICE 2,259,449

COLLECTIVE CONTROL SYSTEM

James H. Bartholomew, Warsaw, N. Y.

Application November 3, 1937, Serial No. 172,607

10 Claims. (Cl. 187—29)

The present invention relates to a collective control system and more particularly to a simplified system for controlling the movement of an object, such as a vehicle, elevator, or the like to one or more predetermined stations.

Known collective control systems are both complicated and expensive to install and maintain, said complication of known systems also often contributes to frequent failures or unreliability in operation.

The primary object of the present invention is the provision of a collective control system for moving objects and which is extremely simple but withal thoroughly effective and reliable in operation.

Another object of the invention is the provision of two direction control circuits for supervising movement of the object or elevator toward a predetermined station and of a plurality of call circuits corresponding to each station and each including a magnetic relay adapted upon being energized to close a pair of normally open contacts which are common to each of said direction control circuits whereby one of the direction control circuits is magnetically maintained in energized condition until the object or elevator arrives at each floor of an energized call circuit in that direction of travel.

A further object is the provision of an object operating control circuit including a pair of normally closed contacts corresponding to certain stations and of call circuits including control assemblies having a supervising means for temporarily opening the corresponding normally closed contacts when the magnetic coil of the corresponding control assembly is de-energized by arrival of the object or elevator at that station or floor.

Still another object of the invention is the provision of an operating control circuit including a normally closed time relay which is opened after the elapse of a predetermined interval following energization thereof and which closes after a predetermined interval following de-energization thereof to interrupt said operating control system after the car has stopped at a floor and until the passenger has had a reasonable opportunity to open the car and/or hatchway door.

Other and further objects of the invention will be suggested to those skilled in the art by the description which follows.

With the foregoing and other objects in view, the invention consists in the improved collective control system for moving objects and elevators and in the form, construction, and relative arrangement of its several parts, as will be hereinafter more fully described and claimed.

Reference is hereby made to the accompanying drawings, wherein like reference characters designate similar elements and wherein.

By way of illustration only, the present invention is disclosed and described as applied to an elevator control system, however, it is to be understood without further reference to the broad application of the invention that it may also be employed as a control system for other types of moving objects or vehicles.

The motive power for moving said object or elevator may be any conventional prime mover such as an electric motor 20 having a shaft 21 to which a worm 22 is connected. A magnetic brake of standard form may comprise a brake drum 23 on shaft 21 and a magnetically operated brake shoe 24 adapted normally to engage said drum 23 and upon being energized to free the same.

The elevator car 25 is suspended from a cable 26 which passes over a sheave 27 and which has a counterweight 28 attached to its other end. The sheave 27 is connected to the prime mover in any suitable fashion such as by a shaft 29 carrying a worm wheel 30 which meshes with worm 22. Operation of motor 20 will move elevator car 25 within its hatchway to elevate or lower said car 25 with respect to the stations or floors *a, b, c* and *d*.

The electric motor 20 is preferably of the three-phase type and is connected to a three-phase source of electrical energy through a plurality of contactors, two of which contactors are operative only alternatively to provide an interlock. The main line contactor 31 comprises an electro-magnetic coil 32, an armature 33 carrying a plurality of contact arms 34, 35 and 36 for closing respectively a plurality of pairs of contacts 37, 38 and 39.

An up contactor 40 comprises an electro-magnetic coil 41, an armature 42 carrying contact arms 43, 44, 45 and 46 for closing respectively a plurality of pairs of contacts 47, 48, 49 and 50, said armature 42 normally being in a position with contact arm 43 closing contacts 47 and with the other pairs of contacts open.

The down contactor 51 comprises an electro-magnetic coil 52, an armature 53 carrying contact arms 54, 55, 56 and 57 for closing respectively a plurality of pairs of contacts 58, 59, 60 and 61, said armature 53 being normally in a position with contact arm 54 closing contacts 58 with the other pairs of contacts open.

The three phase electrical energy is provided through supply mains $L_1$, $L_2$ and $L_3$. One terminal 62 of motor 20 may be connected to supply main $L_1$ through contacts 39 of main line contactor 31 and the magnetic brake shoe 24 is energized across mains $L_1$ and $L_2$ when the main line contactor 31 is energized and contact arms 35 and 36 close pairs of contacts 38 and 39.

When main line contactor 31 and up contactor 40 are energized, terminal 63 of motor 20 is connected through contacts 49 and contact arm 45 to supply main $L_3$ while terminal 64 is connected through contacts 50 and contact arm 46 of the up contactor 40 and contacts 38 and contact arm 35 of main line contactor 31 to the supply main $L_2$. Whereupon, the three phase motor 20 is energized for raising of elevator car 25 and the brake 24 is magnetically held out of engagement.

When main line contactor 31 and down contactor 51 are energized, terminal 63 of motor 20 is then connected through contacts 61 and contact arm 57 of down contactor 51 and contacts 38 and contact arm 35 of main line contactor 31 to supply main $L_2$ and terminal 64 is connected through contacts 60 and contact arm 56 of down contactor 51 to supply main $L_3$. This relative reversal of two phases causes the motor 20 to be energized for rotation in the opposite direction and for lowering of the elevator car 25.

The energization of said contactors 31, 40 and 51 is governed by a central panel including a plurality of control assemblies which are selectively energized by call circuits and including a plurality of selector switches which are operated by a car controlled means. The mechanical features of said control assemblies and selector switches will first be described with respect to Figs. 4–8 and 10–13 inclusive while the electrical connections for said assemblies and selector switches will then be described with respect to Figs. 1–3 and Fig. 9.

Figures 4, 5:
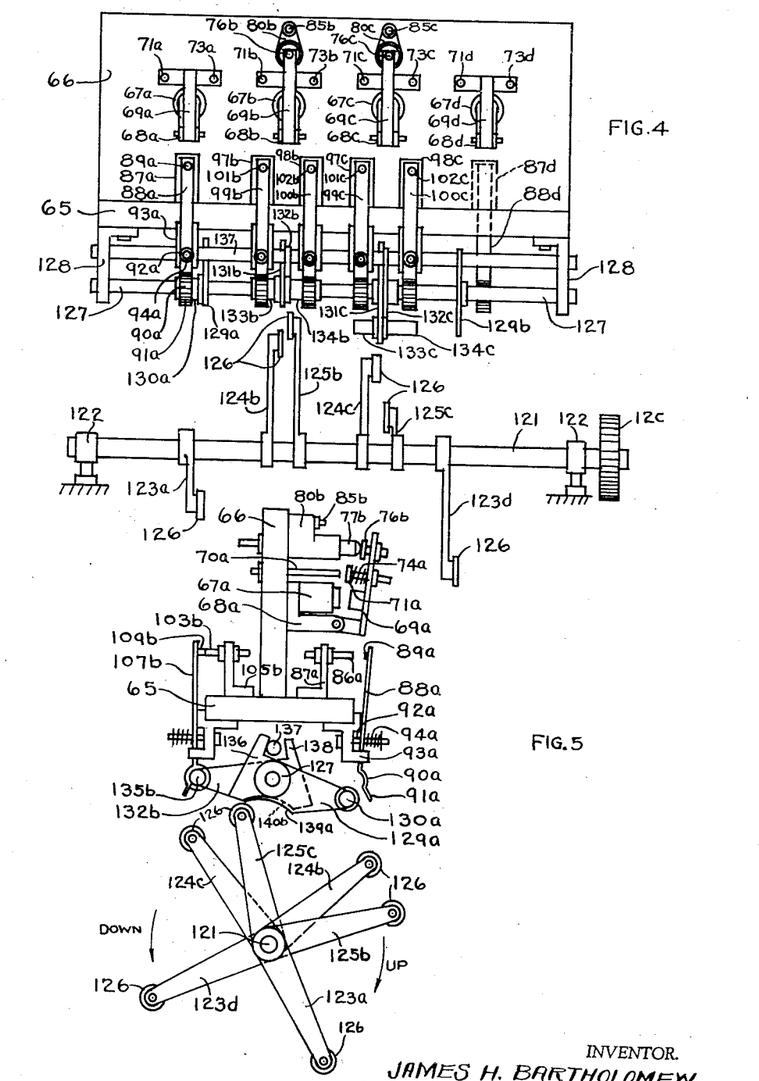
Fig. 4 is a front elevation of the control panel for the preferred form of the invention.
Fig. 5 is an end elevation of said preferred form of control panel.

The control panel, see Figs. 4 and 5, comprises a stationary support which is composed of a base 65 and a vertical panel 66. There is a control assembly and a plurality of selector switches corresponding to each of the floors *a, b, c* and *d*, said assemblies and switches and the parts thereof will be designated both by reference numeral and by the letter corresponding to the floor.

The control assemblies for the respective floors *a, b, c* and *d* each include an operating means which may be composed of electro-magnets 67a, 67b, 67c and 67d mounted on brackets 68a, 68b, 68c and 68d upon said vertical panel 66. Said control assemblies also each include actuating members 69a, 69b, 69c and 69d and two pairs of normally open contacts, contacts 70a, 70b, 70c and 70d and contact 73a, 73b, 73c and 73d of each pair being mounted upon the respective actuating members 69a, 69b, 69c and 69d and being normally extended toward the companion contact as by a spring 74, 74a or 74b, see Figs. 4–8 and 10–13 inclusive. Said actuating members 69a, 69b, 69c and 69d are normally in position to open said pairs of contacts, either by gravity which may be assisted by the action of the spring pressed contacts, see Figs. 6–8, or by separate springs such as springs 75, see Figs. 10–13.

The control assemblies for the intermediate floors are also equipped each with a pair of normally closed contacts and also a supervising means operatively arranged with respect to said normally closed contacts. Said supervising means and normally closed contacts may be provided in any of a variety of ways two of which are disclosed herein, the preferred form being illustrated in Figs. 4–8 and a modified form in Figs. 10–13.

In both forms of the intermediate floor control assembly, the supervising means causes the normally closed contacts to open during movement of the actuating member to inoperative position and then permits said contacts to close or to again become operative. The preferred form of said supervising means includes a dash-pot operatively connected to one of said normally closed contacts.

Figure 6:
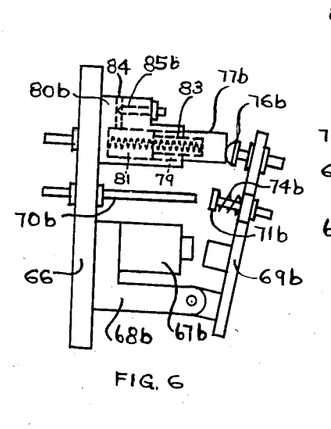
Figs. 6, 7 and 8 are all end elevations of my preferred form of relay for the intermediate stations or floors and illustrated respectively in open position, in closed position, and during opening.
Figure 7:
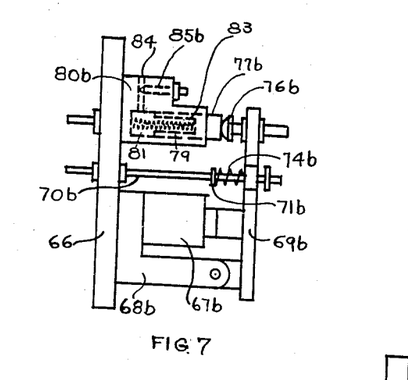
Figure 8:
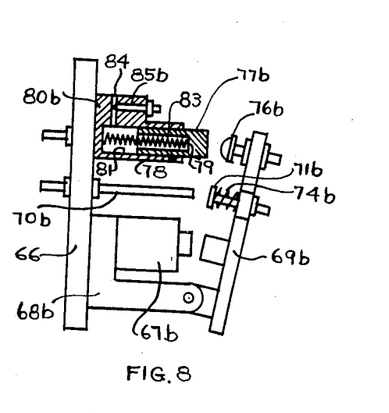

Said normally closed contacts are preferably composed each of a contact 76b and 76c mounted respectively upon actuating members 69b and 69c while the other contact 77b and 77c of each pair is in the form of a plunger provided with a hole 79, see Figs. 6–8. Dash-pot housings 80b and 80c are each mounted upon panel 66 and are each provided with an internal bore 81, a coil spring 83, and a vent 84. Needle valves 85b and 85c may be adjusted to vary the opening in vent 84 and to control the time for spring 83 to urge a plunger contact, such as contact 77b, out of housing 80b and into engagement with contact 76b.

Normally the control assemblies assume the position shown in Fig. 6 with contacts 76b and 77b closed and with contacts 70b, 71b and 72b, 73b open. Then upon energization of electromagnetic coil 67b, actuating member 69b is attracted and plunger contact 77b is retracted against the action of coil spring 83 with the expulsion of air through vent 84. Whereupon the normally open contacts 71b and 73b on actuating member 69b make respectively with the contacts 70b and 72b on the vertical panel 66 and the spring 74b acting on contact 71b is compressed. Such closed position of the control assembly is illustrated in Fig. 7 and it will be noted that normally closed contacts 76b and 77b are closed when the assembly is in the open position of Fig. 6, during closing, and in the closed position of Fig. 7.

When the electro-magnet 67b is de-energized, the actuating member 69b falls to the position shown in Fig. 8, is initially assisted in such movement by the resiliency of the contact spring 74b, and may be further aided in a known manner by gravity or another resilient means. Upon movement of member 69b to open position, the normally open pairs of contacts 70b and 71b, 72b and 73b are opened and the normally closed contacts 76b and 77b are also opened because the needle valve 85b retards the re-entrance of air into the internal bore 81 of dash-pot housing 80b, said needle valve 85b being set so that said contacts 76b and 77b are not closed until the lapse of a predetermined interval. The purpose of this temporary opening or delayed closing of the normally closed contacts 76b and 77b will be explained hereinafter.

The aforementioned control panel also includes a plurality of selector switches which are operated by a car controlled means. Said selector switches and car controlled means may be of any suitable design and one convenient form of these elements is illustrated in Figs. 5 and 4. Only a single selector switch is provided for each extreme floor while two pairs of selector switches are provided for each intermediate floor.

Figure 3:
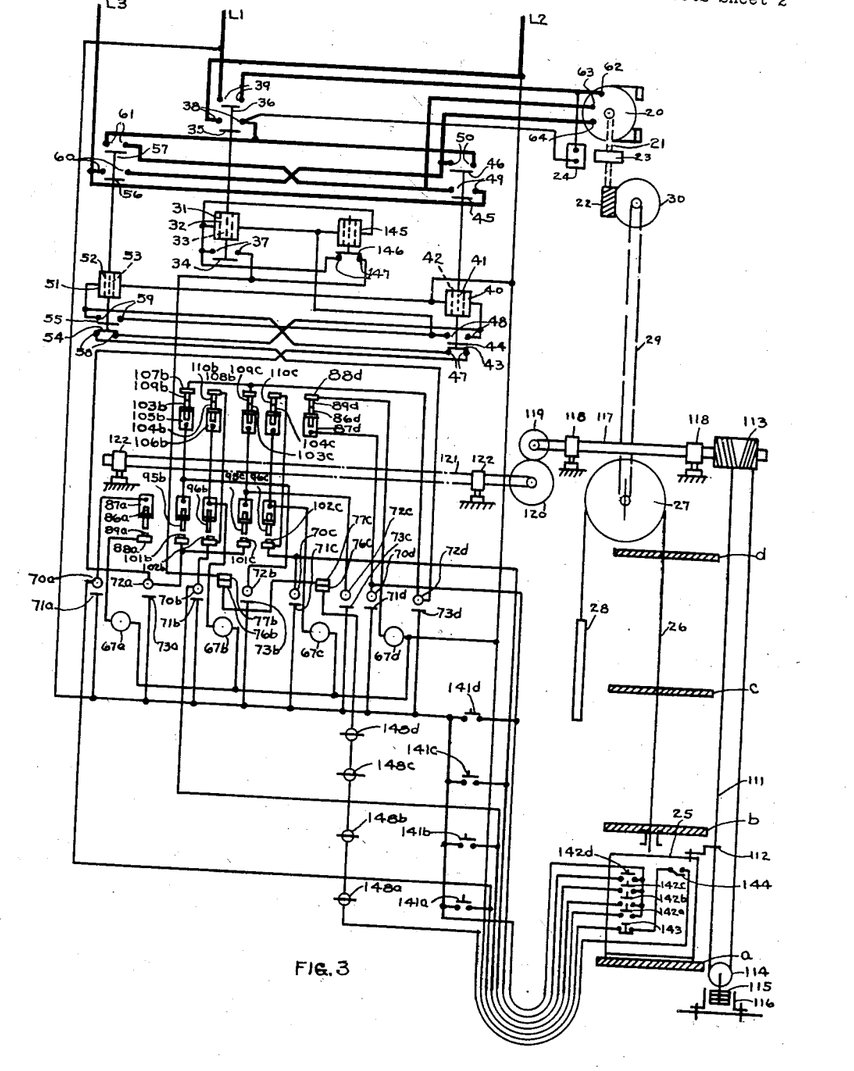
Fig. 3 is a schematic diagram of the preferred form of my collective control system as applied to an elevator installation.

The down selector switch for the lowermost floor comprises a stationary contact 86a mounted upon a bracket 87a on base 65 and also includes a movable arm 88a which carries at one end a contact 89a for engaging contact 86a. Said movable arm 88a has an arcuate portion 90a and a tongue 91a at the other end, is intermediately pivoted on a pin 92a mounted in a bracket 93a on the front of base 65, and is normally maintained in an open position by a spring 94a. The up selector switch for the uppermost floor is identical but is mounted on the back of base 65 so that only the movable arm 88d and bracket 87d are illustrated in Fig. 4 while the stationary contact 86d, bracket 87d, movable arm 88d, and contact 89d are shown in Fig. 3.

Two pairs of selector switches of the same design are provided for each intermediate floor. One pair of such selector switches for floor b is mounted on the front of base 65 and comprises stationary down contacts 95b and 96b mounted respectively in brackets 97b and 98b on base 65 and also includes movable arms 99b and 100b which carry respectively at one end contacts 101b and 102b. The other pair of up selector switches for floor b is mounted on the back of base 65 and comprises, see Figs. 3 and 5, stationary up contacts 103b and 104b mounted respectively in brackets 105b and 106b on base 65 and also includes movable arms 107b and 108b which carry respectively at one end contacts 109b and 110b. Since movable arms 99b, 100b, 107b and 108b are identical in formation and mounted similarly to movable arms 88a and 88d, it is not deemed necessary to describe them in detail again.

The car controlled means has a movement corresponding to car movement and is arranged to operate the selector switches corresponding to a given floor when the elevator car arrives at that floor. Said car controlled means is illustrated in Figs. 3, 4 and 5 and comprises a cable 111 attached to a bracket 112 on elevator car 25. Cable 111 is wound around the drum 113 and is maintained under tension by a sheave 114 and counterweight 115 which is guided by a well 116. The drum 113 is mounted upon shaft 117 which is journaled in bearings 118 and which is connected through reduction gears 119 and 120 to another shaft 121 which is journaled in bearings 122, see Figs. 3 and 4. The gear reduction between said shafts 117 and 121 is preferably such that shaft 121 turns only 340° for movement of the elevator car 25 from one extreme floor to the other. A plurality of actuating arms are adjustably fastened to shaft 121, one actuating arm 123a and 123d being provided for each extreme floor and a pair of actuating arms 124b and 125b, 124c and 125c being provided for each intermediate floor. Each of said actuating arms preferably has a roller 126 journaled in the outer end thereof.

The car controlled means also includes a shaft 127 which is suspended in bracket 128 beneath the base 65. A plurality of actuating segments are rotatably mounted on said shaft 127, single actuating segments 129a and 129d corresponding to the extreme floors and each carrying a roller, such as roller 130a, while pairs of actuating segments 131b and 132b, 131c and 132c correspond to the intermediate floors. Each of said actuating segments 131b and 131c carries a pair of rollers 133b and 134b, 133c and 134c and each of said actuating segments 132b and 132c also carries a pair of rollers, only one such roller 135b is illustrated, see Fig. 5.

Each of said actuating segments 129a, 131b and 131c has a projection 136 which may strike against a shaft 137 also supported in brackets 128 to limit the clock-wise rotation of said segments while actuating segments 132b, 132c and 129d also each have a projection, such as the projection 138 on segment 132b, for striking against said shaft 137 to limit the counterclockwise rotation of said segments. All of said actuating segments are likewise provided with arcuate recesses, such as the recess 139a in segment 129a, see Fig. 5, and the recess 140b in segment 132b.

The mechanical operation of the selector switches and car controlled means will next be described. When the car 25 is at the bottom of the hatchway all of the up selector switches on the back of the control panel are closed, all as illustrated in Fig. 3. Upon movement of the car 25 upwardly, cable 111 is moved to rotate drum 113 and shafts 117 and 121. As a result, the actuating arms 123a, 124b, 125b, 124c, 125c and 123d turn in a clockwise direction as indicated by the arrow in Fig. 5. As said actuating arms are so rotated and by virtue of the curvature of arcuate recesses, such as recess 139a in actuating segment 129a, thus for instance, segment 129a is rotated on shaft 127 in a counterclockwise direction until roller 130a initially strikes tongue 91a on movable arm 88a to close down contacts 86a and 89a of the selector switch for floor a and additional movement of segment 129a causes roller 130a to engage arcuate portion 90a of arm 88a so that actuating segment 129a is maintained in position to hold said contacts 86a and 89a closed.

Just prior to the arrival of car 25 at the floor b, actuating arm 125b engages actuating sector 132b within the arcuate recess 140b therein and immediately as said car is opposite floor b sector 132b moves the rollers therein to open up contacts 103b and 109b, 104b and 110b. Thus when the car 25 arrives at the floor b both pairs of selector switches are open but as the car 25 continues upwardly actuating arm 124b moves actuating sector 131b so that rollers 133b and 134b thereon close down contacts 95b and 101b, 96b and 102b. In the same manner the selector switches for any floor are opened when the car arrives at that floor, while the down selector switches are closed as the car passes a floor in the up direction and the up selector switches are closed as the car passes the floor in the down direction.

The actuating arms 124b and 125b, 124c and 125c are preferably provided in pairs for the intermediate floors so that individual adjustment of said arms on the shaft 121 may be effected although it is understood that a single actuating arm may also be sufficient for the intermediate floors.

A plurality of call circuits are provided and each call circuit corresponds to one of the floors along the hatchway and each includes a call button, one or more selector switches, and the operating means of the corresponding control assembly.

Hall call buttons 141a, 141b, 141c and 141d, see Figs. 1–3 and 9, are placed at each of the respective floors. Car call buttons 142a, 142b, 142c and 142d are mounted on the control panel in car 25 and are connected in parallel with said hall call buttons. An emergency stop button 143 and a car gate switch 144 are also provided on car 25.

The call circuit for either extreme floor, such as floor d, may be traced as follows: from supply main $L_1$, through hall call button 141d or car call button 142d, through the single selector switch consisting of contacts 86d and 89d, through electro-magnet 67d to supply main $L_2$. As previously indicated energization of electro-magnet 67d will attract actuating member 69d of the control assembly for floor d whereupon normally open contacts 70d and 71d are closed so that the call circuit is maintained complete even after the call button is released or opened. It is also obvious that said call circuit for either extreme floor, having once been completed by the holding contacts 70a and 71a, or 70d and 71d, can only be interrupted by opening of the single selector switch for each extreme floor and such interruption requires that the car 25 be present at that floor for appropriate operation of the actuating arms 123a or 123d and actuating sectors 129a or 129d to open the selector switch composed of contacts 86a and 89a or 86d and 89d.

The call circuits for the intermediate floors are completed through either of two selector switches depending on whether the elevator car is below or above that particular floor. Assuming that car 25 is at floor a and conditions are as depicted in Fig. 3 then the call circuit for floor b extends from supply main $L_1$, through hall call button 141b or car call button 142b, through contacts 110b and 104b, and through electro-magnet 67b to supply main $L_2$. If the car 25 had been above floor b, contacts 110b and 104b would have been opened but contacts 96b and 102b would have been closed so that the call circuit would have been completed therethrough. In either event, once the electro-magnet 67b was energized the call circuit would also have been maintained by the holding contacts 70b and 71b of the control assembly irrespective of the call buttons and until the car arrived at the floor b from either above or below, whereupon both selector switches will be opened.

The object or car operating control circuit includes a time relay of conventional form comprising a time relay coil 145 and a switch arm 146 which normally closes contacts 147. Said time relay coil 145 is connected in parallel with the coil 32 of the main line contactor 31 and upon energization after a predetermined interval moves switch arm 146 to open contacts 147 which are in series with said coil 32 but the circuit for energization of coil 32 is then maintained through contacts 37. Said car operating circuit also includes the hatchway gate switches 148a, 148b, 148c and 148d which are connected in series and through the car gate switch 144 and emergency stop button 143 to supply main $L_2$ and which are also connected through the normally closed contacts 76c and 77c, 76b and 77b through contacts 147 or 37, and through either one of the pairs of contacts 48 or 59, respectively, of said directional contactors 40 or 51, and through one of said pairs of contacts 72a and 73a, 72b and 73b, 72c and 73c, or 72d and 73d, to supply main $L_1$.

The operation of the preferred or simplified form of my improved collective control system will now be described. Assume that the elevator car 25 is at rest at floor a and that no calls have been entered. Under such circumstances all of the control assemblies are in open position, the car controlled means has moved all of the up floor selector switches to closed position and all of the down floor selector switches to open position, the car operating control circuit including the normally open contacts of the control assemblies, the main line contactor 31, up contactor 40, down contactor 51, the hatchway gate switches 148a—d, the car gate switch 144, and the emergency button 143 are in the positions indicated in Figs. 1 and 3. The motor operating circuit including the contacts for said contactors 31, 40 and 51 is open and the system is ready for one or more calls from other floors.

Figure 1:
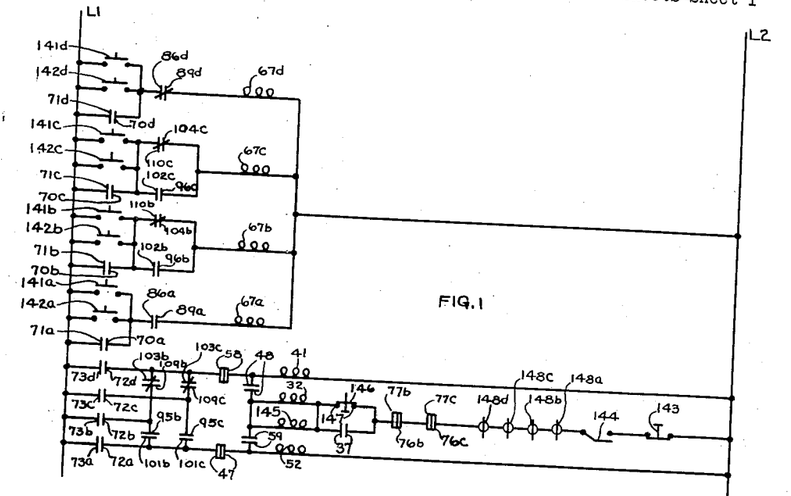
Fig. 1 is a simplified wiring diagram or "straight" of the preferred form of my collective control system.

If a passenger on floor b closes hall call button 141b or if a passenger in elevator car 25 pushes the car call button 142b, the call circuit for floor b is completed as follows: from supply main $L_1$, through hall call button 141b or car call button 142b, through contacts 104b and 110b of one of the up floor selector switches, through electro-magnet 67b, and to supply main $L_2$, see Fig. 1 or Fig. 3. Energization of electro-magnet 67b attracts actuating member 69b, whereupon contact 76b thereon depresses plunger contact 77b to force air out of vent 84, and normally open contacts 70b and 71b, 72b and 73b are closed, which condition is illustrated in Fig. 7. As soon as contacts 70b and 71b are closed the call circuit is maintained independently of the hall call button 141b or car call button 142b, said contacts 70b and 71b acting as holding contacts, see Fig. 1.

Upon energization of the control assembly for floor b, the up direction control circuit is completed from supply main $L_1$, through contacts 73b and 72b, through contacts 103b, and 109b of the other up floor selector switch, contacts 58, and coil 41 of up contactor 40 to supply main $L_2$. Energization of coil 41 attracts armature 42 to move contact arm 43 away from contacts 47 so that coil 52 of the down contactor 51 can not be energized. At the same time contact arm 44 engages contacts 48.

Energization of up contactor 40 completes the operating control circuit as follows: from supply main $L_1$ through contacts 73b and 72b of the control assembly for floor b, through contacts 103b and 109b of said other floor selector switch, through contacts 58, and contact arm 54 of the down contactor 51, through contacts 48 and contact arm 44 of up contactor 40, through the coil 32 of main line contactor 31 and the parallel time relay coil 145, through contacts 147 and switch arm 146 of the time relay, through the normally closed contacts 77b and 76b, 77c and 76c of the control assemblies for the intermediate floors, through the hatchway gate switches 148d—a, through car gate switch 144, and through emergency stop button 143 to supply main L2.

Since main line contactor 31 and up contactor 40 are both energized, the motor operating circuits are completed as previously indicated. Motor 20 is energized to raise car 25 toward floor b and the magnetic brake shoe 24 is disengaged from brake drum 23.

The collective control system of the present invention will receive and register other calls even when the car is in motion without cancelling the previous call or without being cancelled when any other call is collected. For example, suppose that after the car 25 starts to move upwardly toward floor b, as just described, the hall call button 141c is closed.

Such closure of call button 141c will energize the control assembly for floor c, the energized call circuit extending from supply main L1, through hall call button 141c, through contacts 110c and 104c of one of the up floor selector switches, and through electro-magnet 67c to supply main L2. As before holding contacts 70c and 71c are closed to maintain such call circuit, and another operating control circuit is completed from supply main L1, through contacts 72c and 73c, contacts 103c and 109c of the other up floor selector switch, through contacts 58 and 48, main line contactor 31 or the time relay, normally closed contacts 77b and 76b, 77c and 76c, hatchway gate switches 148d—a, car gate switch 144 and emergency stop button 143 to supply main L2.

Within a predetermined interval after the energization of time relay coil 145, switch arm 146 is raised to open contacts 147, but since contacts 37 have been previously closed by contact arm 34 upon energization of main line contactor 31, the operating control circuits are maintained.

As the elevator car 25 moves upwardly, the car controlled means is given a corresponding movement as already explained. When said car 25 is opposite floor b, actuating arms 124b and 125b are in such position that actuating segments 131b and 132b are out of engagement with the movable arms for contacts 101b, 102b, 109b and 110b so that all of the selector switches for floor b are open.

Opening of selector contacts 104b and 110b interrupts the call circuit for floor b so that electro-magnet 67b is de-energized and actuating member 69b moves to inoperative or open position. During opening of the control assembly all of the contacts thereon, both normally closed and normally open contacts, are opened. The coil spring 83 acts to move plunger contact 77b outwardly, normally to re-establish contact, but the pneumatic action of the dash-pot supervising means retards the closing of said normally closed contacts 77b and 76b, see Fig. 8. As a result, said normally closed contacts 77b and 76b are temporarily opened during opening of the control assembly the operating control circuit is interrupted and main line contactor 31 is de-energized to open at least two of the motor operating circuits and stop the car 25 at floor b.

The retardation of the closing of contact 77b and 76b need only be a matter of seconds or sufficient to afford main line contactor 31 ample opportunity to open and can according to my preferred form of control assembly be regulated by adjustment of needle valve 85b. Since the time relay does not close until after a predetermined interval, the car 25 stays at that floor irrespective of re-closing of contacts 77b and 76b or of any other calls in either direction until the elapse of said interval whereby the passenger is provided a reasonable opportunity to open the car gate switch 144 by opening the car door, and/or the hatchway door and hatchway gate switch 148b whereupon all operating control circuits are interrupted until both doors and switches are closed again.

The stop made by the car 25 at floor b does not affect the registered call for floor c which is still maintained as previously traced and which in turn keeps the up direction control circuit and up contactor 40 energized. This electrical maintenance of other call circuits in energized condition is an outstanding and important feature of my invention.

As soon as the passenger for or at floor b has again closed the car and hatchway doors, car gate switch 144 and hatchway gate switch 148b are also closed, in the meantime the predetermined interval of the time relay will have elapsed, so that the operating control circuit is again completed and the car 25 will move upwardly toward floor c. If for any reason neither the car door nor hatchway door is opened during said predetermined interval, then switches 144 and 148b will not be opened so that as soon as the time relay closes the car will proceed to collect the next call. The interval for closing of the time relay may be varied and is, of course, made long enough to provide a passenger an opportunity to open one of the doors. As before mentioned the time relay is of conventional design and also includes known arrangements for varying the length of the interval between energization and opening or between de-energization and closing of the relay.

As the car 25 comes opposite floor c, the actuating arms 124c and 125c, and the actuating sectors 131c and 132c of the car controlled means cause all of the selector switches for that floor to be opened. Thus the call circuit for floor c is de-energized, the operating control circuit is opened by opening of the corresponding control assembly, and the motor operating circuits are interrupted. If there are no more calls from higher floors, the up direction control circuit is also interrupted so that any down calls may be answered.

Assume that just after the car left floor b another passenger put in a call from floor b, such call will be registered by energization of the control assembly for floor b but since the up selector contacts 104b and 110b were opened by upward movement of car 25, the call circuit is now completed through down selector contacts 96b and 102b which were closed as the car moved upwardly from floor b. All calls from above or below the car will be registered and remain registered until the car arrives at that floor. If the car is at a particular floor, any attempt to register a call for that floor will be ineffective because all floor selector switches for that floor are open and the call circuit is interrupted thereby.

Continuing the foregoing assumption, the car 25 is at floor c and a call has been registered at floor b, as soon as the car gate switch 144 and hatchway gate switch 148c is closed, the down direction control circuit will be completed from supply main L1, through contacts 73b and 72b, selector contacts 95b and 101b, contacts 47 and contact arm 43, and down contactor coil 52 to supply main L2. Whereupon armature 53 is moved to open contacts 58 and prohibit energization of the up contacts 40, contact arm 55 closes contacts 59 to energize the main line contactor 31, and contact arms 56 and 57 close contacts 60 and 61 which complete the motor operating circuit with two phases reversed and the motor 29 is energized to move car 25 downwardly.

The passenger entering the car at floor $c$ would also close car call button 142a for returning to the ground floor, but for reasons previously indicated the car would stop at floor $b$ and then continue to floor $a$. The up floor selector contacts are closed and the down selector contacts are opened by the car controlled means as the car descends. When the car is opposite floor $a$ selector contacts 86a and 89a are opened and the car is stopped.

From the operations just described it is evident that the present invention presents a simple but fully automatic system of collective control. The temporary opening of the normally closed contacts on the control assemblies makes such simplification possible and may be accomplished in a number of ways, one of which is by the pneumatic supervising means previously described and which is preferred, another of which is a magnetic supervising means which will now be described.

Figure 2:
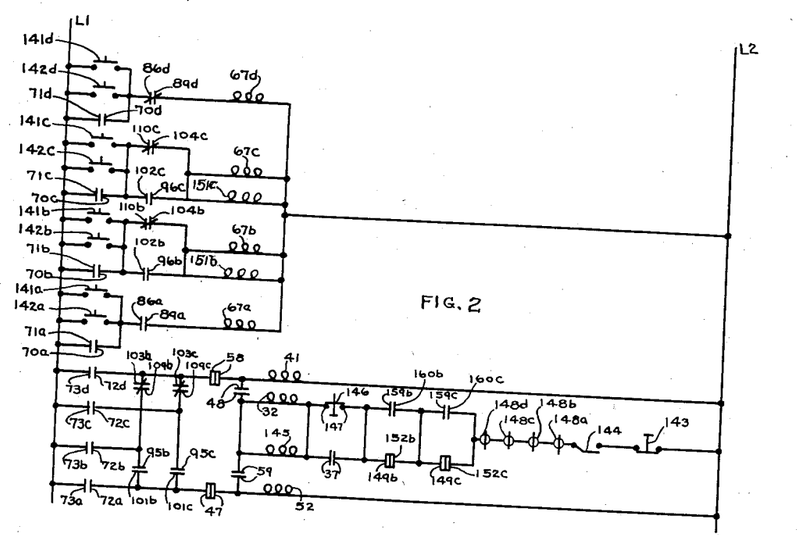
Fig. 2 is a simplified wiring diagram or "straight" of a modified form of my collective control system.
Figure 9:
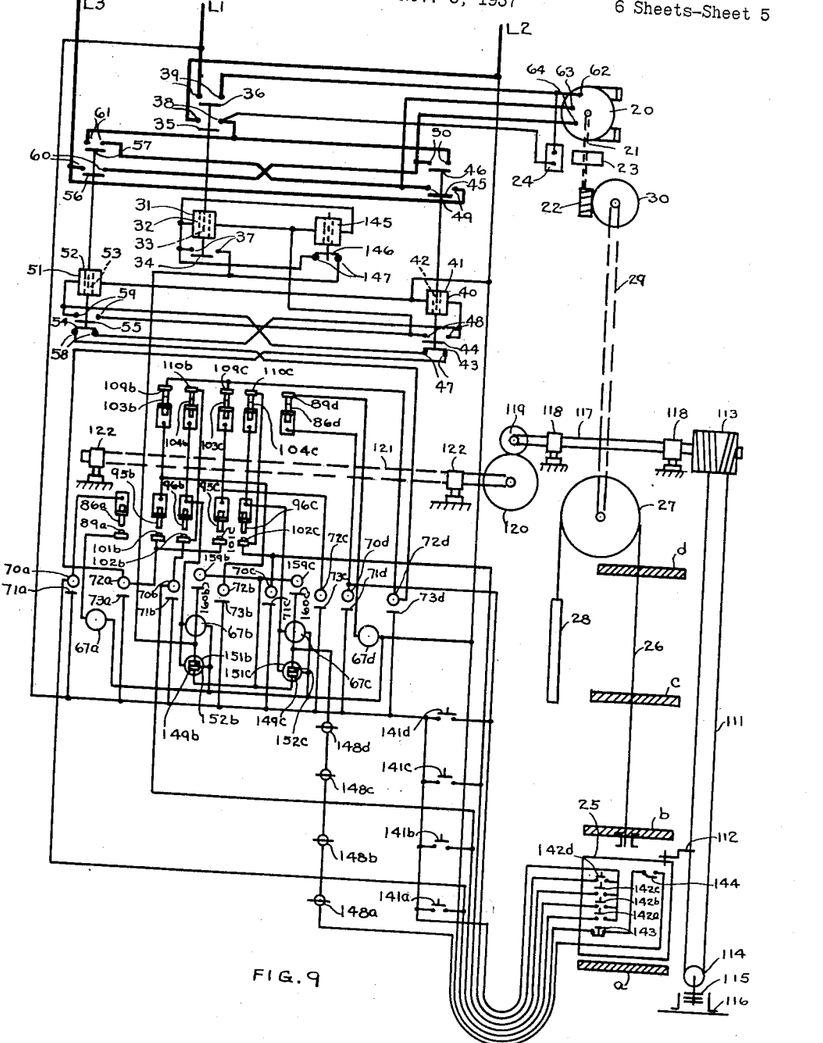
Fig. 9 is a schematic diagram of the modified form of my collective control system.

The arrangement of the motor operating circuits, direction control circuits, call circuits, selector switches and car controlled means are all the same as previously described and also illustrated in Figs. 2 and 9. The main differences are in the control assemblies and manner of connecting the same in the operating control circuits.

The modified control assembly is shown in Figs. 10-13 and as before includes a vertical panel 66, upon which an electro-magnet and bracket, such as electro-magnet 67 and bracket 68, are mounted. An actuating member 69 is pivotally mounted on bracket 68 and carries a pair of contacts 71 and 73 which are resiliently urged to an extended position as by springs 74. A pair of stationary contacts 70 and 72, indicated in Fig. 9, are mounted on the panel 66 while a spring 75 normally moves actuating member 69 to inoperative position normally to open the pairs of contacts 70 and 71, 72 and 73.

Figure 10:
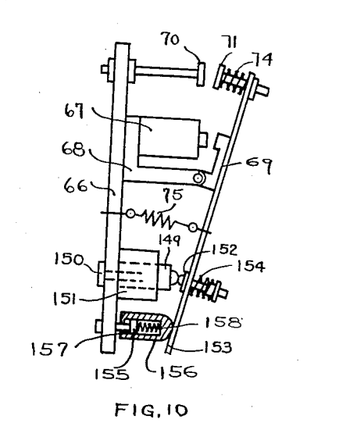
Figs. 10, 11, 12 and 13 are all end elevations of the modified form of relay for the intermediate stations or floors and illustrated respectively in open position, during closing, in closed position, and during opening.
Figure 11:
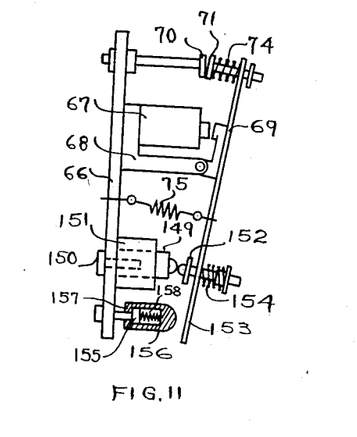
Figure 12:
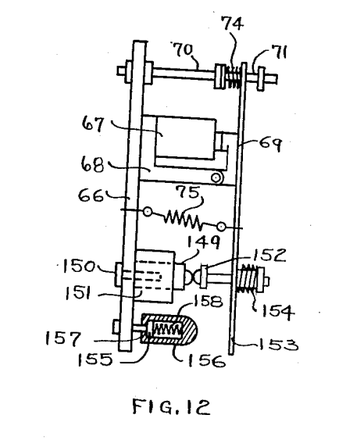
Figure 13:
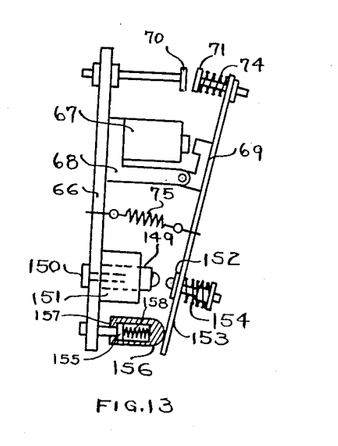

A pair of normally closed contacts, includes a contact 149 mounted on panel 66 by a bolt 150 and surrounded by supervising means such as a magnetic coil 151, and also includes a contact 152 of magnetic material, movably mounted on an extension 153 of actuating member 69, and normally urged by a spring 154 into the retracted position shown in Figs. 10, 12 and 13.

A retarding means comprises a dash-pot including a piston 155 mounted on panel 66, a cap 156 fittingly loosely over piston 155 and having a shoulder 157 engaging the rear of piston 155. A spring 158 is mounted within cap 156 and normally extends the same so that shoulder 157 abuts piston 155, see Fig. 12, but said spring 158 is weaker than spring 75 so that, upon de-energization of electro-magnet 67, cap 156 is slowly retracted by the action of extension 153 and spring 75, being retarded in such movement by the slow escape of air between piston 155 and cap 156.

The modified control assemblies for the intermediate floors are provided respectively with pairs of normally closed contacts, see the normally closed contacts 149b and 152b, 149c and 152c illustrated in Figs. 2 and 9, and with supervising means such as magnetic coils 151b and 151c. As before, all of the control assemblies each have two pairs of normally open contacts 70a and 71a, 72a and 73a; 70b and 71b, 72b and 73b; 70c and 71c, 72c and 73c; and 70d and 71d, 72d and 73d while the intermediate floor assemblies each have an extra pair of normally open contacts 159b and 160b, 159c and 160c. The motor operating circuits, the direction control circuits, and car controlled means are provided in identical fashion for the modified control assemblies as for the preferred form thereof. The only difference in the calls circuits is that for the intermediate floors the magnetic supervising means, such as magnetic coils 151b and 151c, are connected in parallel with the electro-magnets 67b and 67c of the control assemblies for said intermediate floors. The principal difference resides in the operating control circuits and is now to be described.

With no calls registered the modified operating control circuit extends, see Figs. 2 and 9, from supply main $L_2$, through the emergency stop button 143, car gate switch 144, hatchway gate switches 148a, 148b, 148c and 148d, normally closed contacts 152c and 149c, 152b and 149b, contacts 147 and switch arm 146 of the time relay, through coil 32 of the main line contactor 31, and to one of contacts 48 of the up contactor 40 or one of contacts 53 of the down contactor 51, which contactors 40 and 51 are both open. If the car is at floor $a$ and a call for floor $d$ is registered, the corresponding control assembly is energized through the contacts 86d and 89d of the floor selector switch, electro-magnet 67d is energized to close holding contacts 71d and 70d, and normally open contacts 72d and 73d are also closed. Upon closure of said contacts 72d and 73d, the coil 41 of up contactor 40 is energized to close contacts 48 and open contacts 47 to establish direction and the modified operating control circuit is completed through contacts 48, 58, 72d and 73d to $L_1$ whereupon the car 25 is moved upwardly to collect the call. At the same time coil 32 of main line contactor 31 is energized to close contacts 37 so that said operating control circuit is maintained even after the elapse of the predetermined interval and opening of contacts 147 of the time relay.

Assume now during such upward travel of the car 25, that a call is registered for floor $c$ to cause energization of the electro-magnet 67c and magnetic coil 151c of the modified control assembly for that floor. The actuating member 69 will be attracted and normally open contacts 70c and 71c, 72c and 73c, 159c and 160c will be closed. Such movement of the actuating member 69 would ordinarily open the normally closed contacts 149c and 152c and might interrupt the operating control circuit, however, since said magnetic coil 151c is in parallel with electro-magnet 67c it is also energized through contacts 70c and 71c and contact 152c is magnetically maintained against contact 149c and the spring, such as coil spring 154, acting on said contact 152c is compressed, see Figs. 11 and 12. Consequently the car 25 will continue on to floor $c$ whereupon floor selector switch contacts 104c and 110c are opened and the call circuit is interrupted to de-energize electro-magnet 67c and magnetic coil 151c. Floor selector switch contacts 103c and 109c are also opened but this in itself would not interrupt the operating control circuit in view of the call for floor $d$ and fact that contacts 72d and 73d are still closed. However, upon simultaneous interruption of the magnetic coils 67c and 151c, the control assembly for floor $c$ is in the condition illustrated in Fig. 13, with all contacts opened. Spring 154 has moved contact 152 away from contact 149 and the pneumatic means or dash pot retards the acting of spring 75 to re-close contacts 149 and 152.

As readily observed from Figs. 2 and 9, simultaneous opening of contacts 149c and 152c, 156c and 160c interrupts the operating control circuit and de-energizes main line contactor coil 32 to open contacts 37. Time relay coil 145 is also de-energized but contacts 147 are not closed until the elapse of the predetermined interval so that the passenger has an opportunity to open the car or hatchway door and the respective switches 144 or 148c. The retardation to re-closing of normally closed contacts 149c and 152c need only be sufficient to allow main line contacts 37 to open and need bear no relation to the predetermined interval of the time relay but is preferably of shorter duration than said interval so that if the doors are not opened the car is available to answer other calls as soon as the time relay is closed. When car and hatchway switches 144 and 148c and the time relay contacts 147 are closed the operating control circuit is again completed and the car continues upwardly to floor d. Since the up direction control circuit has not been interrupted it is not possible for any other calls to affect the travel of the car to collect said call.

It should be understood that the pneumatic or dash-pot retardation to closing of the normally closed contacts of the modified control assemblies for the intermediate floors are not essential but merely insure proper operation of the system and to guard against failure of the car to collect a call by reason of sluggishness or chattering of the main line contactor.

As herein indicated, the present invention is susceptible of many variations wherefore the present disclosure shall not be construed in a limiting sense, the scope of the invention being defined in the claims which follow.

Having now particularly described my invention what I desire to secure by Letters Patent of the United States and what I claim is:

1. In a system for controlling the movement of an object to a plurality of stations, the combination with a prime mover connected to said object and for moving the same in either of two directions, a pair of direction control means each associated with said prime mover alternatively to supervise movement of said object in opposite directions and each including two pairs of directional control elements corresponding to each intermediate station, and a plurality of call means each corresponding to a station, each call means for the extreme station including a pair of control elements and each call means for the intermediate station including two pairs of control elements, of an object controlled means connected for movement corresponding to the movement of said object, oppositely operating the pairs of control elements as the object passes a station, and opening the pairs of control elements when the object is opposite said station.

2. In a system for controlling the movement of an object to a plurality of stations, the combination with a prime mover connected to said object and for moving the same in either of two directions, and an operating control means associated with said prime mover to supervise movement of said object, including a main line contactor, including a pair of normally inoperative control elements corresponding to each station, and including a pair of normally operative control elements corresponding to each intermediate station, of a plurality of call means corresponding to each station and each including a control assembly for rendering said inoperative control elements operative when the object is desired at that station, and a supervising means on each control assembly for the intermediate stations and rendering said normally operative control elements inoperative when the object arrives at a desired station and until said main line contactor opens.

3. In a collective control system for an elevator car which is movable to a plurality of floors, the combination with a motor operatively connected to said car for moving the same in either of two directions, and an operating control circuit associated with said motor to supervise movement of said car, including a main line contactor, including a pair of normally open contacts corresponding to each floor, and including a pair of normally closed contacts corresponding to each intermediate floor, of a plurality of call circuits corresponding to each floor and each including a control assembly adapted upon being energized to close said normally open contacts corresponding to a floor at which the car is desired, and a supervising means on each control assembly for the intermediate floors, associated with said normally closed contacts for that floor, and adapted upon deenergization of the control assembly temporarily to open said normally closed contact until said main line contactor opens when the car arrives at said floor.

4. In a control system for an elevator car which is movable to a plurality of floors, the combination wtih a motor operatively connected to said car and for moving the same, and a door switch means of a time interval relay which is normally closed, which is adapted upon elapse of a predetermined interval after energization to open and which is adapted after an interval following deenergization to close, and an operating control circuit associated with said motor to supervise movement of said car, including said door switch means and said time interval relay which upon interruption of said operating control circuit prevents completion thereof until after said interval and after an opportunity has been afforded to open said door switch means.

5. In a control system for an elevator car which is movable to a plurality of floors, the combination with a motor operatively connected to said car and for moving the same, and a plurality of door switches each also corresponding to a floor, of a time interval relay which is normally closed and which is adapted upon elapse of a predetermined interval after energization to open, and which is adapted after an interval following deenergization to close, and an operating control circuit associated with said motor to supervise movement of said car, including said door switches and said time interval relay in series.

6. In a collective control system for an elevator car which is movable to a plurality of floors, a combination with a motor operatively connected to said car and for moving the same in either of two directions, a pair of direction control circuits connected respectively to supervise operation of said motor in opposite directions, and each including a selector switch corresponding only to each intermediate floor, and a pair of control contacts corresponding to each floor and common to both direction control circuits, of a plurality of call circuits each corresponding to a floor and each including a control assembly adapted to be energized when the elevator is desired at the corresponding floor and for closing the corresponding control contacts in the direction control circuit, and a car controlled means connected for movement corresponding to car movement and for operating said selector switches so that only that direction control circuit is energized which will cause movement of the car toward the floor of the energized call circuit.

7. In a collective control system for an elevator car which is movable to a plurality of floors, the combination with an operating control circuit including a pair of normally closed control contacts corresponding to each intermediate floor and including a time interval relay which is normally closed and which is adapted upon energization to open after an interval and upon de-energization to close after an interval, a control assembly corresponding to each floor, a pair of normally open contacts also corresponding to each floor and adapted to be closed by the respective control assembly, and a supervising means associated with each pair of normally closed contacts and operative, when the control assembly for an intermediate floor is de-energized, to permit the normally closed contacts to open only temporarily and then to close after an interval which is less than the interval for said time interval relay to close, of a plurality of call circuits each corresponding to a floor and each for energizing the control assembly for that floor, and a car controlled means connected for movement corresponding to car movement and for interrupting the call circuit when the car reaches a desired floor whereupon the respective control assembly is de-energized and the supervising means causes said normally closed contacts to be opened and then closed before said time interval relay closes.

8. In a system for controlling the movement of an elevator car to one or more predetermined floors, the combination with an up direction control circuit including a selector switch correponding to each intermediate floor, a down direction control circuit including a selector switch corresponding to each intermediate floor, and a pair of control contacts corresponding to each floor and each connected to complete either direction control circuit, of an operating control circuit arranged to be connected to the energized direction control circuit, for controlling the operation of said elevator car, and a plurality of control assemblies corresponding to each floor, said control assemblies for the intermediate floors each having a pair of normally closed control contacts which are connected in series in said operating control circuit, and a supervising means on each control assembly corresponding to the intermediate floor for temporarily opening said normally closed control contacts when the control assembly is deenergized.

9. In a system for controlling the movement of an elevator car to a plurality of floors, the combination with a control assembly corresponding to each intermediate floor, including normally operative control elements, and a supervising means on each assembly for causing said control elements to become inoperative, of an operating control means including all of said normally operative control elements in successive arrangement, for controlling the movement of said elevator car, and interrupted to stop said car upon opening of any set of normally closed control elements under the action of said supervising means upon arrival of the car at the corresponding floor, said supervising means after an interval becoming inoperative and permitting said control elements to return to operative position to restore said operating control means to operative condition.

10. In a system for controlling the movement of an elevator car to one or more predetermined floors, the combination with a control assembly corresponding to each intermediate floor, including an energizing member, normally closed control contacts, and a supervising means on each assembly and for causing said control contacts to open for an interval following only deenergization of the energizing member of said control assembly, of an operating control circuit including in series all of said normally closed contacts and for controlling the movement of said elevator car, a call circuit corresponding to each intermediate floor, including a selector switch and said energizing member of said control assembly and adapted to be energized when a car is desired at one of said floors, and a car controlled means operatively connected for movement corresponding to car movement, for interrupting the selector switch and call circuits when the car arrives at said floor, and for causing deenergization of the control assembly whereupon the corresponding normally closed contacts in said operating control circuit are temporarily opened under the influence of said supervising means.

JAMES H. BARTHOLOMEW.